United States Patent
Venugopal et al.

(10) Patent No.: US 8,310,924 B2
(45) Date of Patent: Nov. 13, 2012

(54) METHOD AND APPARATUS FOR PROVIDING QOS FOR MP SUBSCRIBERS AT THE SUBSCRIBER LEVEL

(75) Inventors: Prashanth Venugopal, San Jose, CA (US); Brian Kean, Cincinnati, OH (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 444 days.

(21) Appl. No.: 12/121,628

(22) Filed: May 15, 2008

(65) Prior Publication Data

US 2009/0285108 A1    Nov. 19, 2009

(51) Int. Cl.
*H04L 12/26* (2006.01)
(52) U.S. Cl. ......................... 370/230; 370/474
(58) Field of Classification Search .......... 370/229–230, 370/474
See application file for complete search history.

(56) References Cited

U.S. PATENT DOCUMENTS

| | | | |
|---|---|---|---|
| 6,654,808 B1 * | 11/2003 | Chuah ........................... | 709/227 |
| 6,778,495 B1 * | 8/2004 | Blair .............................. | 370/230 |
| 7,586,918 B2 * | 9/2009 | Levy et al. .................. | 370/395.1 |
| 2003/0039250 A1 * | 2/2003 | Nichols et al. ................ | 370/394 |
| 2005/0052992 A1 * | 3/2005 | Cloonan et al. ............... | 370/229 |
| 2006/0062224 A1 | 3/2006 | Levy et al. | |
| 2006/0062253 A1 | 3/2006 | Chinnaiah et al. | |
| 2007/0071035 A1 | 3/2007 | Evans et al. | |

OTHER PUBLICATIONS

Sklower, K., et al., "The PPP Multilink Protocol (MP)", Request for Comments (RFC) 1990, Aug. 1996, 23 pages.
International Search Report and Written Opinion, Application No. PCT/US09/43842, dated Jun. 29, 2009.

* cited by examiner

*Primary Examiner* — Kibrom T Hailu
*Assistant Examiner* — Benjamin Lamont
(74) *Attorney, Agent, or Firm* — Blakely Sokoloff Taylor & Zafman, LLP (57) ABSTRACT

A method for providing Quality of Service (QoS) for a Multilink Protocol (MP) subscriber at the subscriber level is described. In one embodiment of the invention, a network element fragments a packet destined for a subscriber into multiple fragments and adds any necessary encapsulations (e.g., MP protocol encapsulation, Point-to-Point protocol encapsulation, layer 2 encapsulations). The network element links the fragments together to form a MP batch packet. The network element sends the MP batch packet to a single egress queue associated with the subscriber. The fragments are distributively transmitted across the links associated with the subscriber. Other methods and apparatuses are also described herein.

20 Claims, 7 Drawing Sheets

METHOD AND APPARATUS FOR PROVIDING QOS FOR MP SUBSCRIBERS AT THE SUBSCRIBER LEVEL

BACKGROUND

1. Field

Embodiments of the invention relate to the field of networking; and more specifically, to Multilink Protocol Quality of Service (QoS).

2. Background

The Multilink Protocol (MP) (described in Request for Comments (RFC) 1990, "The PPP Multilink Protocol (MP)", August 1996) allows multiple physical links to be aggregated into a single logical link. For example, a subscriber may have multiple Digital Subscriber Line (DSL) links that may be aggregated into a single logical link with the combined bandwidth of all of the multiple DSL links. Packets are fragmented into a plurality of fragments and the fragments are distributively transmitted across the multiple physical links.

A typical network element that provides QoS support for the Multilink Protocol, applies QoS properties for each of the multiple physical links. For example, in a typical network element, a separate group of queues is allocated for each of the multiple physical links associated with a subscriber (the number of queues in the group is dependent on the priority level scheme). In a typical Internet Protocol (IP) QoS priority level scheme, which includes eight priority levels, each physical link associated with the subscriber has 8 queues (one queue for each priority level). Thus, the total number of queues required for QoS support is the number of physical links times the number of queues in the group of queues.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Subscriber computer end stations (e.g., workstations, laptops, palm tops, mobile phones, etc.) access content/services provided over the Internet and/or content/services provided on virtual private networks (VPNs) overlaid on the Internet. Typically, subscriber computing end stations are coupled (e.g., through customer premise equipment coupled to an access network, wirelessly to an access network) to edge network elements, which are coupled through core network elements of the Internet to the server computing end stations.

Some network elements support the configuration of multiple contexts. As used herein, each context is an instance of a virtual network element (e.g., a virtual router or a virtual bridge). Each context typically shares one or more computing resources (e.g., memory, processing cycles, etc.) with other contexts configured on the edge network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es). By this separation, service providers may employ multiple contexts to provide direct network access for customers and/or provide different classes of services for customers.

A method and apparatus for providing Quality of Service (QoS) support for Multilink Protocol (MP) subscribers at the subscriber level is described. In one embodiment of the invention, a network element fragments a packet destined for a subscriber into multiple fragments and adds any necessary encapsulations (e.g., MP protocol encapsulation, Point-to-Point protocol encapsulation, layer 2 encapsulations). The network element links the fragments together to form a MP batch packet. The network element sends the MP batch packet to a single egress queue associated with the subscriber. The fragments are distributively transmitted across the links associated with the subscriber. In another embodiment of the invention, MP sequencing information is not added to the fragments unless the single egress queue can support each fragment.

Figure 1:
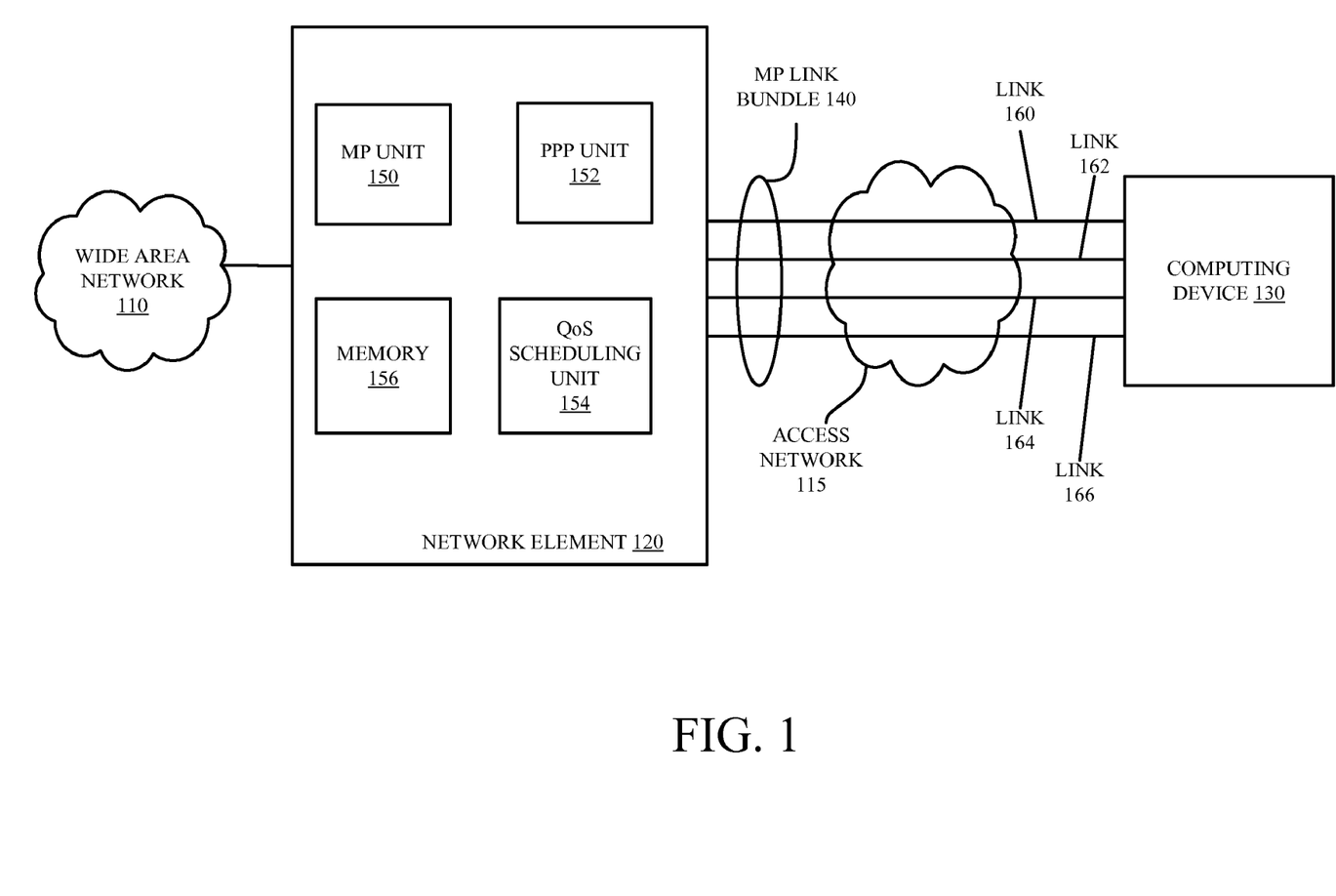
FIG. 1 illustrates an exemplary network configured with a Multilink Protocol according to one embodiment of the invention.

FIG. 1 illustrates an exemplary network configured with a Multilink Protocol according to one embodiment of the invention. The network element 120 is coupled with the Wide Area Network 110 (e.g., the Internet). The network element 120 is further coupled with the computing device 130. According to some embodiments of the invention, the network element 120 is providing network services to the computing device 130 (e.g., access to the Wide Area Network 110). In addition, according to some embodiments of the invention, the network element 120 is an edge network element. As used herein, an edge network element is positioned at the edge of an autonomous system that communicatively interconnects a number of core network elements (e.g., including network elements within the WAN 110) with other equipment belonging to other autonomous systems. As used herein, an autonomous system is a set of one or more network elements (edge and/or core network elements) under the control of one or more network service providers that singularly presents a common routing policy to a common network (e.g., the Internet).

The computing device 130 may take different forms depending on embodiments of the invention, including a workstation, a desktop computer, a laptop computer, a palm top, a mobile phone, etc. The computing device 130 is coupled with the network element 120 through the access network 115. The access network 115 may include one or more network elements (e.g., a layer 2 switch (e.g., a digital subscriber line access multiplexer (DSLAM), a L2TP access concentrator (LAC)), etc.). In addition, in some embodiments of the invention, the network element 120 may be a L2TP network server. Additionally, while not shown in FIG. 1 for simplicity purposes, it should be understood that the computing device 130 is likely coupled to the network element 120 through customer premise equipment (e.g., modems, home routers, etc.).

The network element 120 includes a MP unit 150, a PPP (Point-to-Point Protocol) unit 152, a QoS scheduling unit 154, and a memory 156. According to one embodiment of the invention, the MP unit 150, the PPP unit 152, and the QoS unit 154 are included as part of an egress processing unit of a line card of the network element 120. Each of these will be described in greater detail later herein. The computing device 130 is coupled with the network element 120 with the links 160, 162, 164, and 166. It should be understood that the characteristics of each of these links may be different (e.g., bandwidth). Together, these links form the MP link bundle 140 (the links 160, 162, 164, and 166 are member links of the aggregate MP link bundle 140). Thus, a subscriber of the computing device 130 has four links to the network element 120. In addition, the subscriber of the computing device 130 is a MP subscriber (the subscriber is utilizing the MP functionality on the network element 120).

According to one embodiment of the invention, the network element 120 uses the Multilink Protocol to fragment packets received from the WAN 110 destined for the computing device 130, and selectively distributes the fragments over the links 160, 162, 164, and 166. It should be understood that in embodiments of the invention a different number of links couple the computing device 130 with the network element 120. However, typically a subscriber of the computing device 130 has at least two links coupling the network element 120 with the computing device 130. It should also be understood that if a network element within the access network 115 (e.g., layer 2 switch) exists between the computing device 130 and the network element 120, the computing device 130 has multiple links coupling it to the network element within the access network 115 and that network element may have a single aggregate link (aggregate of each of the multiple links of the computing device 130) coupled with the network element 120.

Figure 2A:
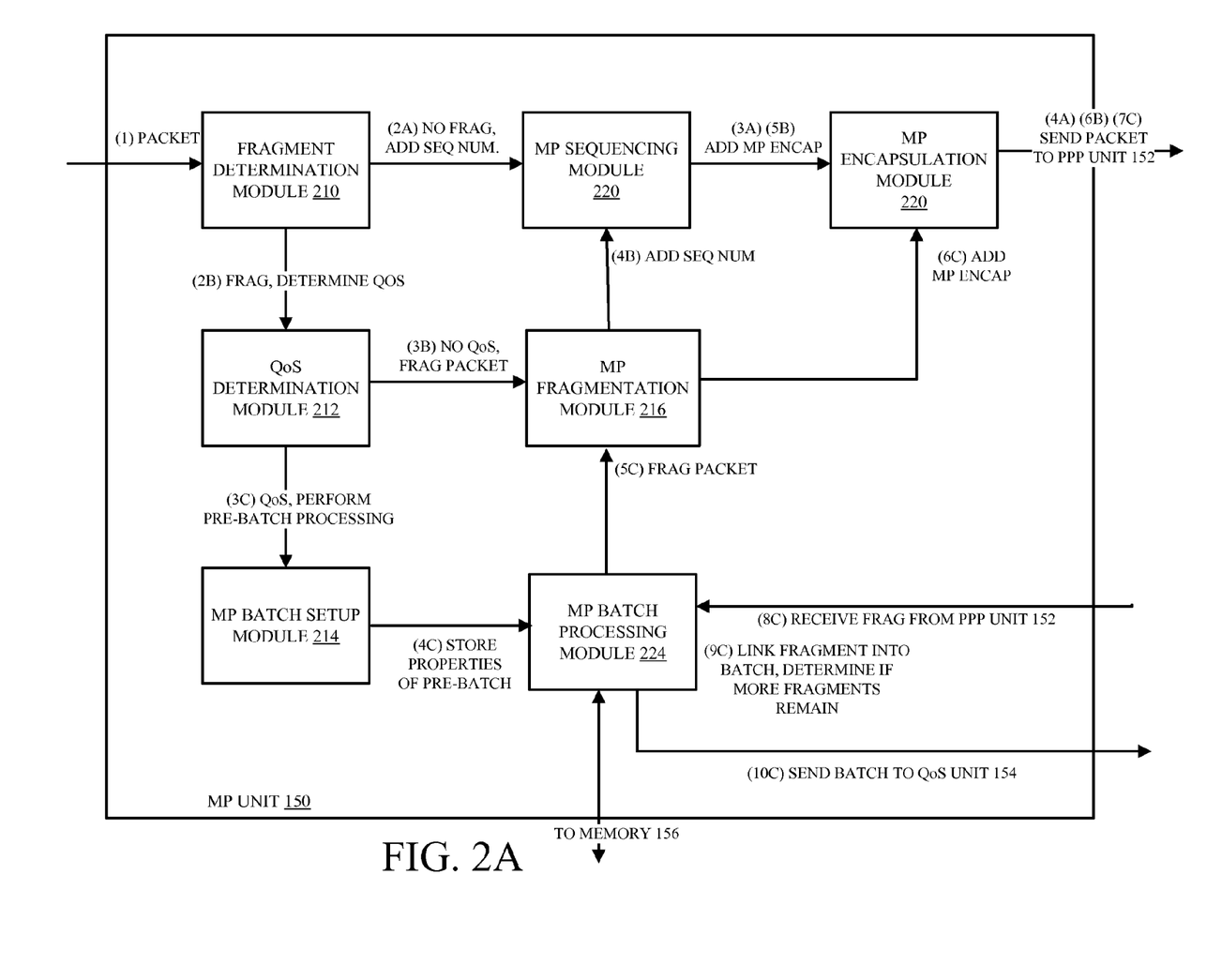
FIG. 2A is a data flow diagram illustrating a Multilink Protocol unit in the network element of FIG. 1 according to one embodiment of the invention.

FIG. 2A is a data flow diagram illustrating the MP unit 150 in the network element 120 of FIG. 1 according to one embodiment of the invention. The architecture of the MP unit 150 illustrated in FIG. 2A is an example of an architecture of a MP unit and other, alternative architectures may be used with the embodiments of the invention described herein. At operation 1, a packet destined for the computing device 130 enters the MP unit 150 and the fragment determination module 210 determines whether the packet should be fragmented. According to one embodiment of the invention, if the packet is over a certain size, the MP unit 150 fragments the packet into multiple fragments. The size threshold which may trigger fragmentation may be configured by a network administrator and/or set as a policy in the network element 120. If fragmentation is not to be performed, then at operation 2A, a MP sequencing number is added to the packet by the MP sequencing module 220. As is known in the art, MP sequencing numbers are used by the receiving device (e.g., the computing device 130 and/or customer premise equipment coupled with the computing device 130) during reconstruction of the packets (e.g., in case the packets are received out of order). In addition, at operation 3A, MP encapsulation is added to the packet by the MP encapsulation module 222, and at operation 4A the packet is sent to the PPP unit 152 for further processing, which will be described in greater detail later herein.

If the fragmentation determination module 210 determines that the packet should be fragmented, then at operation 2B, the QoS determination module 212 determines whether the subscriber associated with the packet (e.g., the subscriber associated with the computing device 130) has QoS attributes (e.g., rate limiting attributes, scheduling attributes, etc.) that need to be processed. According to one embodiment of the invention, a subscriber record associated with the subscriber indicates whether the subscriber has QoS attributes. According to one embodiment of the invention, the QoS determination module 112 accesses the memory 156 to determine whether the subscriber record has QoS attributes. It should be understood that the memory 156 may not include the entire subscriber record. For example, a control card (not shown for simplicity purposes) may signal to the MP unit 150 that the subscriber associated with the packet has QoS attributes. Additionally, it should be understood that in some embodiments of the invention, an initial lookup into a subscriber record data structure is performed in an earlier processing stage (e.g., by an ingress processing unit on the line card receiving the packet). For example, a AAA (authentication, authorization, and accounting) lookup was performed (e.g., RADIUS, Diameter, etc.) to identify a subscriber record for the subscriber and information in the subscriber record is sent to the egress processing unit (e.g., the MP unit 150, the PPP unit 152, the QoS scheduling unit 154) and/or stored in the memory 156. According to one embodiment of the invention, the subscriber record also identifies one or more virtual routers in the network element 210 to which that subscriber's traffic should be bound, and the physical entity carrying that subscriber's traffic (e.g., a circuit) is bound to an interface of that virtual router.

If QoS attributes are not applicable for the subscriber, then at operation 3B, the MP fragment module 216 fragments the packet according to the MP protocol. Each of those fragments are sent to the MP sequencing module 220 at operation 4B, where a sequence number is added for each of the fragments. The MP sequencing module 220 sends those fragments with the sequence numbers to the MP encapsulation module 222 at operation 5B. The MP encapsulation module 222 adds MP encapsulation to each of the fragments and sends each of the fragments to the PPP unit 152 for further processing at operation 6B.

If QoS attributes are applicable for the subscriber, then at operation 3C, the batch setup module 214 performs pre-batch processing of MP fragments. According to one embodiment of the invention, pre-batch processing includes determining how many fragments will be derived from the packet, creating a linked list of the fragments of the packets which includes information on how to access each of the fragments and the fragments order. In addition, the pre-batch processing may include setting a flag on the packet which indicates that this packet is a batch packet. Other flags may also be set (e.g., a flag may indicate that if any of the fragments are dropped then the entire batch of fragments is to be dropped).

After the batch setup module 214 finishes performing pre-batch processing, at operation 4C, the MP batch processing module 224 stores the properties of the pre-batch processing. According to one embodiment of the invention, the MP batch processing module 224 stores the properties of the pre-batch processing in the memory 156. The MP batch processing module 224 sends the packet to the MP fragmentation module 216 at operation 5C, where the MP fragmentation module 216 fragments the packet into a first MP fragment. According to some embodiments of the invention, the MP fragmentation module 216 stores the first MP fragment's properties in the memory 156 (e.g., size of the fragment, pointer to the fragment, etc.).

According to one embodiment of the invention, the packet received by the MP fragmentation module 216 includes the flag indicating that the packet is a MP batch packet. If the packet is a MP batch packet, the MP fragmentation module 216 sends the MP fragment to the MP encapsulation module 222 at operation 6C, where the MP encapsulation module 222 adds MP encapsulation to the MP fragment. The MP encapsulation module 222 sends the MP fragment to the PPP unit 152 for further processing at operation 7C. At operation 8C, the MP batch processing module 224 receives the fragment from the PPP unit 152 (with additional encapsulations) which will be described in greater detail in reference to FIG. 2B. The MP batch processing module 224 links that fragment into the batch, and determines whether any more fragments are to be made at operation 9C. Each additional fragment will follow similar operations as operations 6C-9C. It should be understood that MP sequence numbers have not been applied to any of the fragments in the MP batch packet. After each fragment of the batch has been made and has been processed by the MP unit 150 and the PPP unit 152, at operation 10C, the MP batch processing module 224 sends the entire batch to the QoS scheduling unit 154 for further processing.

Figure 2B:
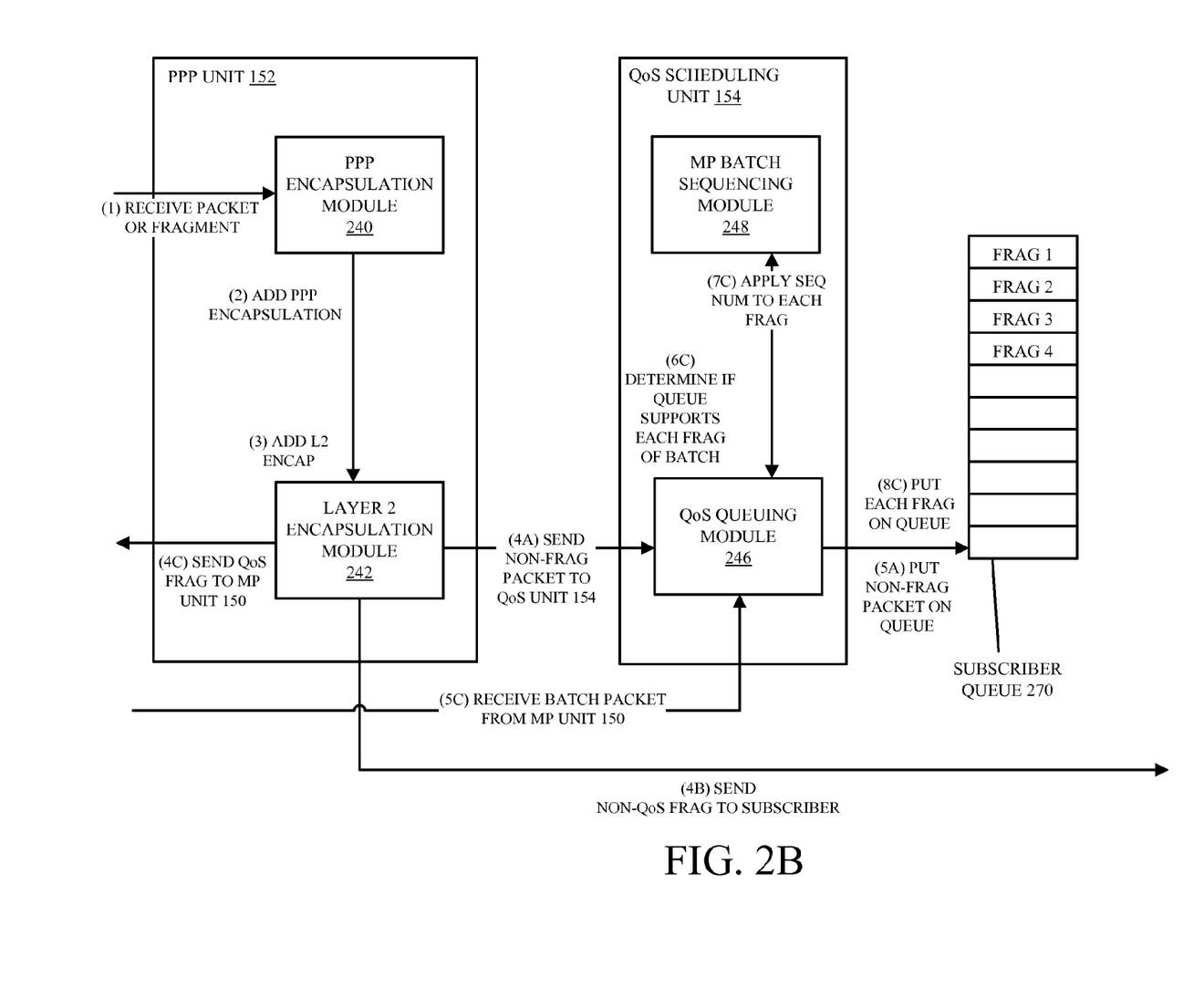
FIG. 2B is a data flow diagram illustrating a Point-to-Point Protocol unit and a Quality of Service scheduling unit of the network element of FIG. 1 according to one embodiment of the invention.

FIG. 2B is a data flow diagram illustrating the PPP unit 152 and the QoS scheduling unit 154 of the network element 120 according to one embodiment of the invention. At operation 1, the PPP unit 152 receives a packet (the packet may be a non-fragmented packet (e.g., sent during operation 4A of FIG. 1), a fragment of a non-QoS flagged packet (e.g., sent during operation 6B of FIG. 1), or a fragment of a MP batch packet (e.g., sent during operation 7C of FIG. 1). At operation 2, the PPP encapsulation module 240 encapsulates the packet or fragment with PPP information. At operation 3, the layer 2 encapsulation module 242 encapsulates the packet or fragment with layer 2 information.

If the PPP unit 152 is processing a non-fragmented packet for a subscriber with QoS properties, then at operation 4A, the PPP unit 152 sends the packet to the QoS scheduling unit 154. The QoS queuing module 246 places the packet on the subscriber queue 270 at operation 5A. The subscriber queue 270 is a queue representing the MP link bundle 140. While not shown in FIG. 2B for simplicity purposes, the subscriber queue 270 is one of a group of queues associated with the subscriber. For example, the number of queues in the group of queues depends on the priority level scheme being used. A typical IP QoS priority level scheme includes eight priority levels. Thus, for an IP QoS scheme, a subscriber may have eight queues in the group of queues. According to one embodiment of the invention, the subscriber queue chosen is dependent on the priority level of the incoming packet.

If the PPP unit 152 is processing a fragment for a subscriber without QoS properties, then at operation 4B, the packet is transmitted towards the subscriber. If the PPP unit 152 is processing a fragment of a MP batch packet, then at operation 4C, the PPP unit 152 sends the fragment to the MP unit 150.

At operation 5C, the QoS scheduling unit 154 receives a MP batch packet from the MP unit 150 (e.g., sent by the MP batch processing module 224 during operation 10C of FIG. 2A). At operation 6C, the QoS queuing module 246 determines if the subscriber queue 270 can support each fragment in the MP batch packet. For example, the subscriber queue 270 has a predefined amount of fragments it supports, which is called the depth of the subscriber queue 270. According to one embodiment of the invention, the depth of the subscriber queue 270 is subscriber dependent. In other words, some subscribers may have a different subscriber queue depth than other subscribers. The subscriber queue depth may be found in a subscriber record for a particular subscriber. If the subscriber queue 270 supports each fragment, then at operation 7C the MP batch sequencing module 248 applies a sequence number to each of the fragments. However, if the subscriber queue 270 cannot support each fragment of the MP batch packet, according to one embodiment of the invention the entire MP batch packet will be dropped, and sequence numbers will not be applied to the fragments.

Thus, according to one embodiment of the invention, the QoS scheduling unit 154 makes its scheduling decisions based on the properties of the MP batch packet, rather than based on properties of each fragment. In other words, unlike typical network elements providing QoS support for MP subscribers, each fragment of the MP batch packet is treated similarly. For example, either each fragment will be transmitted towards the subscriber or none of the fragments will be transmitted towards the subscriber. As described previously, in a typical network element providing QoS support for MP subscribers, fragments are individually treated and individually transmitted to MP subscribers. Thus, some of the fragments of a packet may be transmitted while others may be dropped (e.g., if one or more of the link queues cannot support the fragments). It should be understood that the subscriber can only reconstruct the packet if all of the fragments are received. Thus, if the subscriber does not receive each fragment of the packet, the subscriber will drop the fragments it has received. However, it should be understood that bandwidth has already been used (i.e., fragments have been transmitted to the subscriber) and subscriber resources and/or network element resources have been used unnecessarily (e.g., attempting to reconstruct the packet). In addition, if the subscriber does not receive each fragment of the packet, the subscriber must also reconcile the sequence numbers. For example, if one fragment is not received by the subscriber, the subscriber will have a gap of one sequence number, which must be reconciled.

On the other hand, in some embodiments of the invention, sequence numbers are added to the fragments of a MP batch packet if the entire MP batch will likely be transmitted (and thus likely received by the subscriber). Therefore, it is likely that the subscriber will not need to perform processing to reconcile a sequence number gap. In addition, in some embodiments of the invention, unless each fragment of a single MP batch packet will likely be transmitted (e.g., can be placed in a subscriber queue), no fragments will be transmitted. In other words, in some embodiments of the invention the entire MP batch packet is dropped if any its fragments are dropped. Thus, bandwidth is conserved and resource usage is conserved (e.g., processing cycles, memory, etc.).

At operation 8C, the QoS queuing module 246 places each of the fragments of the MP batch packet into the subscriber queue 270. The fragments are then distributively transmitted towards the computing device 130 over the links 160, 162, 164, and 166. The fragments may be distributively transmitted in a variety number of ways in different embodiments of the invention, including round-robin, weighted fair queuing, and priority weighted fair queuing. According to one embodiment of the invention, as previously described, the subscriber queue 270 is one of a group of queues associated with the subscriber. For example, the number of the group of queues may depend on the priority level scheme being used (e.g., a typical IP priority level scheme includes 8 priority levels; thus there would be 8 queues (one for each priority level)). However, it should be understood that unlike typical network elements providing QoS for MP subscribers, there is not a group of queues for each of the links 160, 162, 164 and 166. Thus, according to one embodiment of the invention, each fragment of a certain MP batch packet is placed in a single queue associated with the subscriber (each fragment is associated with the same priority level). Thus, in some embodiments of the invention, the total number of queues required to support QoS for a MP subscriber is based on the number of queues in the group of queues associated with that MP subscriber, and is not based on the number of links associated with the MP subscriber. Thus, as compared with typical network elements, embodiments of the invention reduce the total number of queues necessary to support QoS for a MP subscriber. It should be understood that reducing the number of queues reduces the amount of resources required (e.g., allocated memory to store the queues, processing cycles, etc.).

Figure 3:
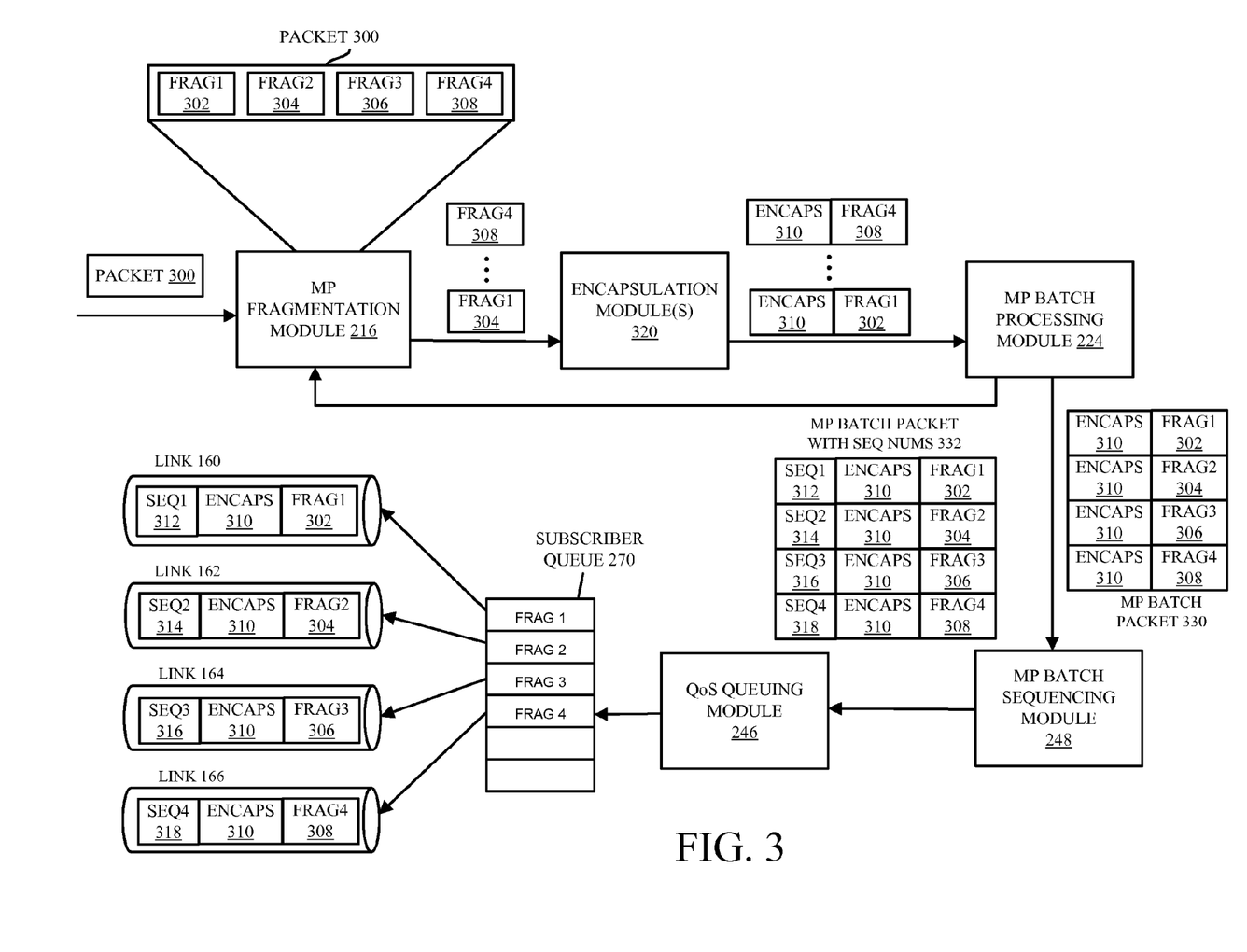
FIG. 3 illustrates providing QoS support at the subscriber level according to one embodiment of the invention.

FIG. 3 is an alternative view of a network element providing QoS support at the subscriber level according to one embodiment of the invention. The MP fragmentation module 216 receives the packet 300. The packet 300 belongs to a MP subscriber, and QoS attributes are applicable for that MP subscriber. The MP fragmentation module 216 fragments the packet 300 into four fragments (fragments frag1 302-frag4 308). It should be understood that in one embodiment of the invention, the MP fragmentation module 216 fragments the packet into a single fragment at a time. The fragment frag1 304 is sent to the encapsulation module(s) 320, where the fragment is encapsulated with on or more encapsulations 310 (e.g., MP encapsulation, PPP encapsulation, layer 2 encapsulation). The encapsulation module(s) 320 send the encapsulated fragment frag1 302 to the MP batch processing module 224. The MP batch processing module 224 links the encapsulated fragment frag1 into the MP batch packet 330. In a similar fashion, each of the fragments frag2 304-frag4 308 are encapsulated with one or more encapsulations and linked into the MP batch packet 330.

After the MP batch 330 is complete (e.g., after each fragment of the original packet 300 is linked in the MP batch 330), the MP batch sequencing module 248 applies a sequence number to each fragment in the MP batch 330. Thus, sequence numbers seq1 312-seq4 318 are applied to the fragments frag1 302-frag4 308 respectively as illustrated in the MP batch packet with sequence numbers 332. The QoS queuing module 246 receives the MP batch packet with sequence numbers 332 and places each fragment into the subscriber queue 270 (the subscriber queue 270 does not include the encapsulation information or the sequence numbers of each fragment for simplicity purposes). The fragments frag1 302-frag4 308 are distributively transmitted across the subscriber's links 160, 162, 164 and 166 respectively. While the distribution illustrated in FIG. 3 is a round-robin approach, other alternative distribution techniques are within the scope of the invention.

Figure 4A:
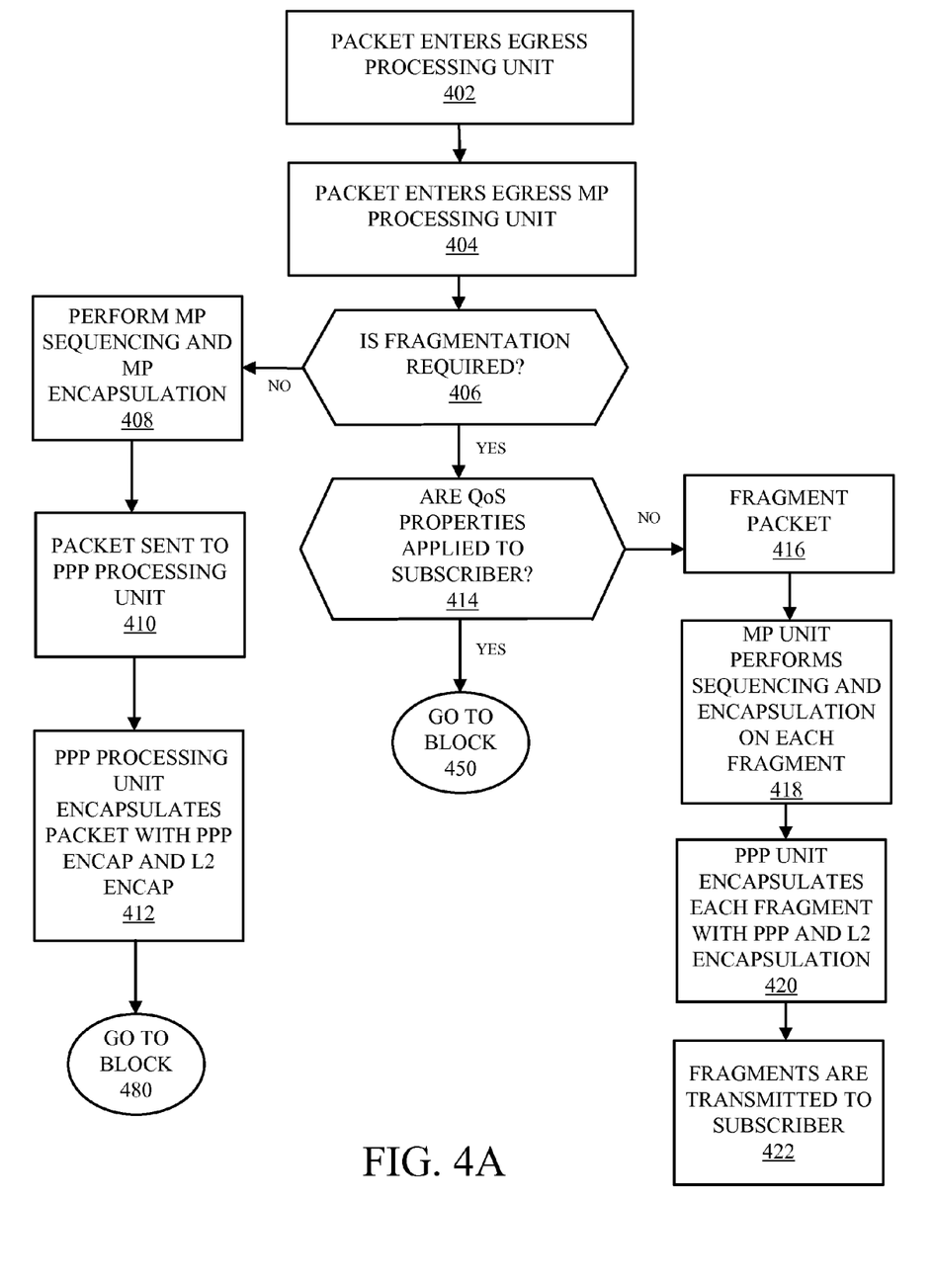
FIGS. 4A, 4B, and 4C are flow diagrams illustrating providing Multilink Protocol support for subscribers according to one embodiment of the invention.
Figure 4B:
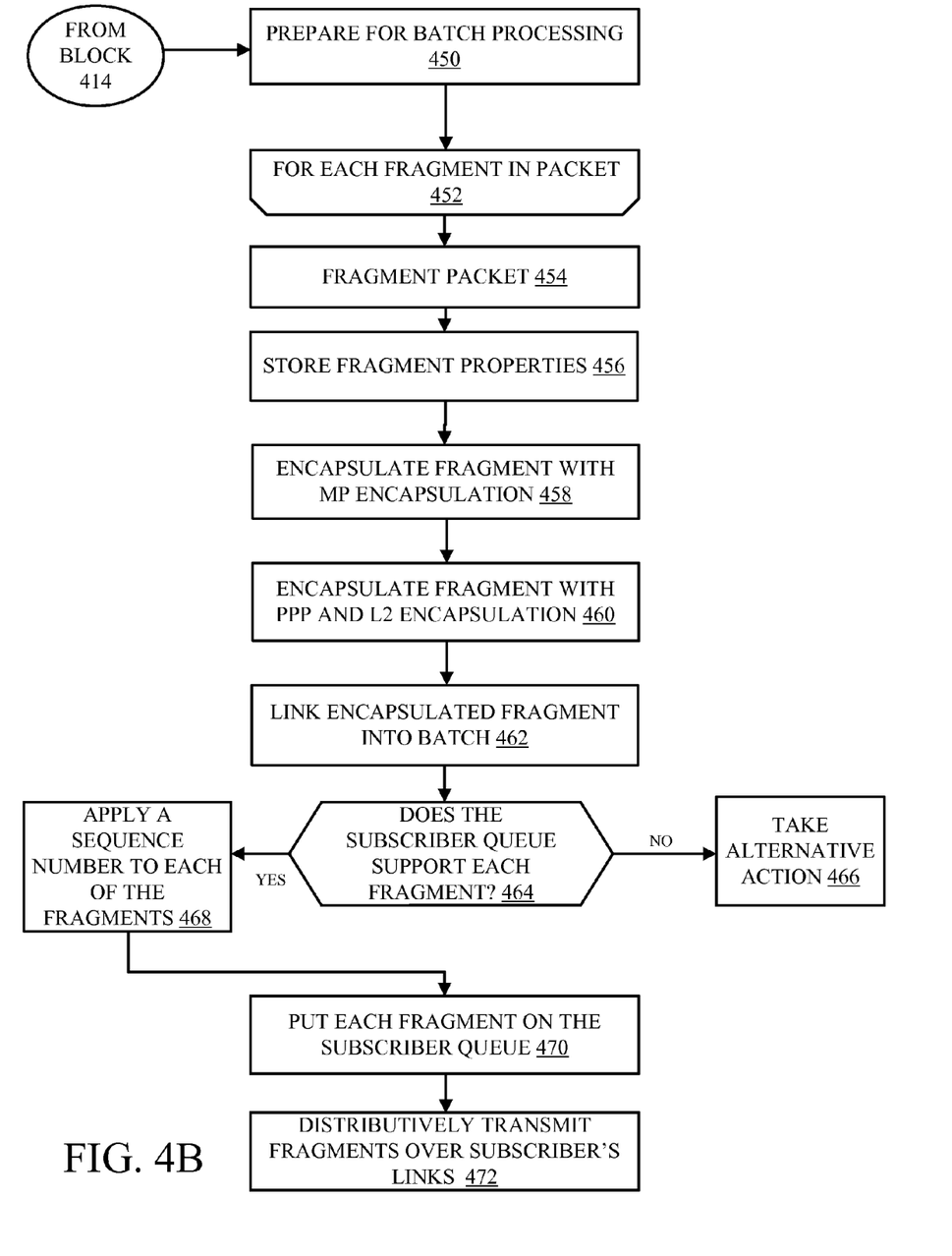
Figure 4C:
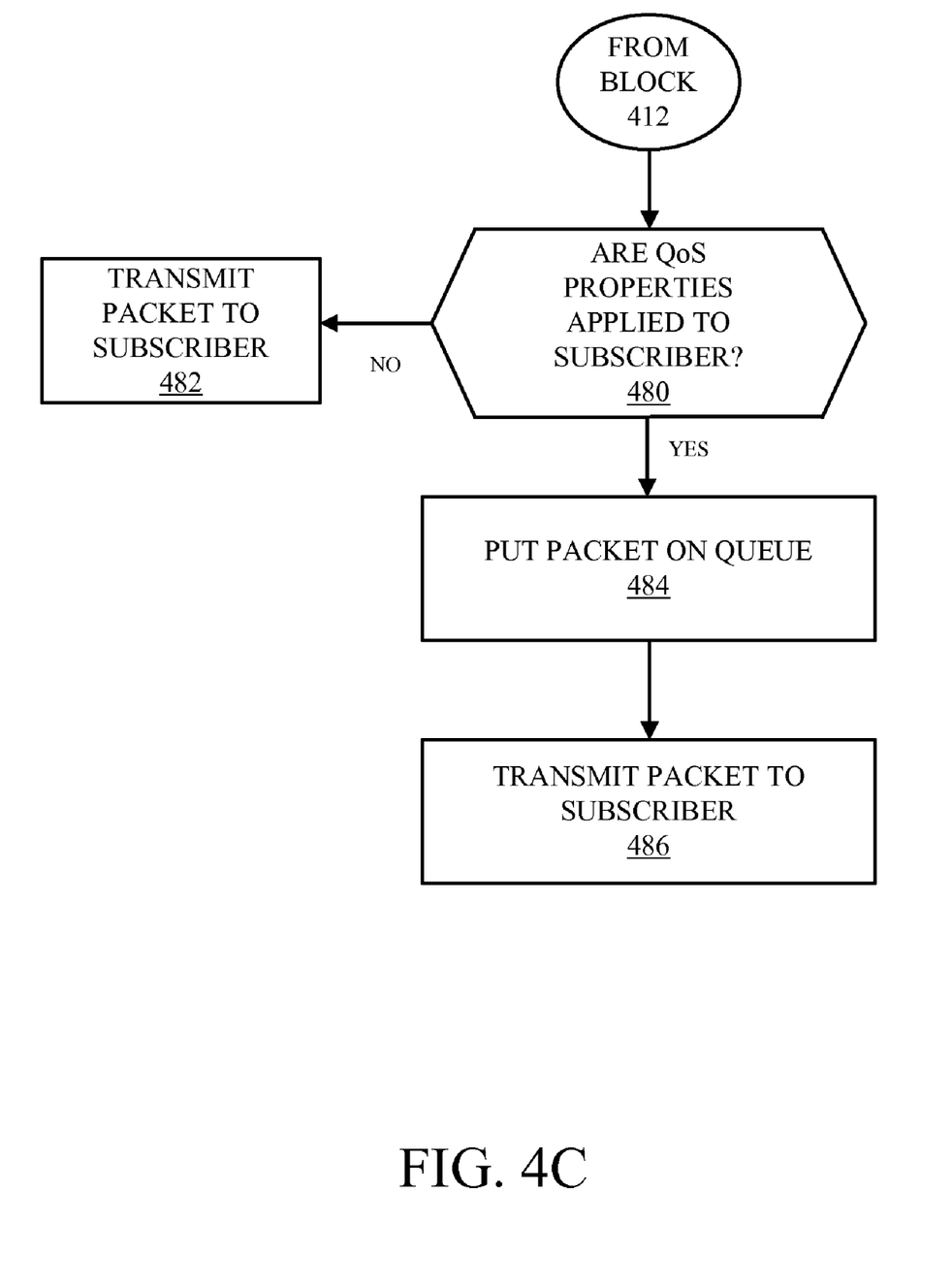

FIGS. 4A, 4B, and 4C are flow diagrams illustrating providing Multilink Protocol support for subscribers according to one embodiment of the invention. At block 402, a packet enters an egress processing unit of a network element (e.g., in a line card of the network element) and flow moves to block 404. According to one embodiment of the invention, at the point the packet enters into the egress processing unit, the packet has already undergone ingress processing including determining the destination of the packet, and a subscriber associated with the packet (e.g., by performing a subscriber record lookup in a subscriber record data structure, determining the priority of the packet, etc. At block 404, the packet enters a MP processing unit, and flow moves to block 406. Thus, according to one embodiment of the invention, the packet is a MP packet.

At block 406, a determination is made whether the packet is to be fragmented. For example, according to one embodiment of the invention, if the packet is over a predefined size, the packet will be fragmented. Of course it should be understood that other criteria for determining whether to fragment the packet is also within the scope of the invention (e.g., configuration, packet priority, etc.). If fragmentation is to be performed, then flow moves to block 414.

At block 414, a determination is made whether QoS properties are applied to the subscriber associated with the packet. For example, according to one embodiment of the invention, QoS properties are indicated in a subscriber record associated with the subscriber. The QoS properties may indicate a number of different things depending on the embodiment of the invention including: rate limiting policy, QoS scheduling properties (e.g., depth of subscriber queues, scheduling algorithms, etc.), etc. If QoS properties are applied to the subscriber, then flow moves to block 450 (which will be described in reference to FIG. 4B). However, if QoS properties are not applied to the subscriber (thus no QoS processing is needed), then flow moves to block 416.

At block 416, the packet is fragmented, and flow moves to block 418. At block 418, a sequence number is added to each fragment and each fragment is encapsulated with MP encapsulation information, and flow moves to block 420. At block 420, a PPP unit encapsulates each fragment with PPP and layer 2 encapsulation, and flow moves to block 422 where each fragment is transmitted to the subscriber.

Referring back to back 406, if fragmentation is not to be performed, then flow moves to block 408. At block 408, a sequence number is added to the packet and the packet is encapsulated with MP encapsulation, and flow moves to block 410. The packet is sent to a PPP processing unit for further processing at block 410, and flow moves to block 412. At block 412, the packet is encapsulated with PPP encapsulation and layer 2 encapsulation (e.g., PPPoE encapsulations, PPPoA encapsulations, PPPoAoE encapsulations, etc.), and flow moves to block 480, which will be described in greater detail in reference to FIG. 4C.

Referring to FIG. 4B, at block 450, the MP unit prepares for batch processing of the fragments. For example, according to one embodiment of the invention, the MP unit determines how many fragments will be created from the packet, determines the beginning and ending of each fragment in the packet, creates a linked list for the MP batch packet, sets a flag in the packet indicating a MP batch packet, and sets other flags in the packet (e.g., a flag may be set which indicates that if one fragment is dropped, then all of the fragments in the MP batch packet are to be dropped). Flow moves from block 450 to block 452.

At block 452, for each fragment that will be derived from the packet, the blocks 454-462 are performed. At block 454, the packet is fragmented, and flow moves to block 456. At block 456, the properties of the fragment are stored. According to one embodiment of the invention, the properties of the fragment stored include the size of the fragment, a pointer to the current fragment in the linked list, etc. Flow moves to block 458, where the fragment is encapsulated with MP encapsulation. Flow moves from block 458 to block 460, where the fragment is further encapsulated with PPP and layer 2 encapsulations. Flow moves from block 460 to block 462.

At block 462, the encapsulated fragment is linked into the MP batch packet, and if more fragments remain to be created in the fragment, flow moves back to 454. However, if there are no more fragments remaining to be created, flow moves to block 464. At block 464, a determination is made whether the subscriber queue supports each fragment (e.g., whether the subscriber queue has available queue positions for each of the fragments). If the subscriber queue cannot support each fragment, thus each fragment cannot be transmitted to the subscriber, then flow moves to block 466 where alternative action is taken. While in one embodiment of the invention the entire MP batch packet is dropped if the subscriber queue cannot support each fragment, in alternative embodiments of the invention the fragments are put into a buffer until the queue can support each fragment. However, if the subscriber queue can support each fragment, then flow moves to block 468.

At block 468, a sequence number is applied to each of the fragments, and flow moves to block 470. At block 470, each fragment is put on the subscriber queue, and flow moves to block 472. It should be understood that the subscriber queue represents the MP link bundle, and not any of the subscriber's individual links. At block 472, the fragments are distributively transmitted the subscriber's individual links.

Referring to FIG. 4C, at block 480, a determination is made whether QoS attributes are applicable for the subscriber. If no QoS attributes are applicable, then flow moves to block 482 where the packet is transmitted to the subscriber. However, if QoS attributes are applicable for the subscriber, then flow moves to block 484. At block 484, a QoS scheduling unit puts the packet on a queue, and flow moves to block 486 where the packet is transmitted to the subscriber.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method for providing Quality of Service (QoS) for a Multilink Protocol subscriber, wherein the Multilink Protocol subscriber is coupled with a network element with an aggregate link which includes a plurality of member links, comprising:

receiving a first packet destined for the subscriber;
determining whether to fragment the first packet into a plurality of fragments;
fragmenting the first packet into the plurality of fragments, wherein each fragment is encapsulated with a Multilink Protocol encapsulation;
linking each of the fragments to form a single first batch Multilink Protocol packet;
after linking each of the fragments to form the single first batch Multilink Protocol packet, determining whether a single, same, egress queue for the subscriber supports each fragment in the single first batch Multilink Protocol packet; and
responsive to determining that each fragment can be supported in the single, same, egress queue,
applying a Multilink Protocol sequence number to each fragment in the single first batch Multilink Protocol packet;
placing each fragment in the single first batch Multilink Protocol packet in the same, single, egress queue for the subscriber associated with the aggregate link; and
distributively transmitting the fragments over the member links.

2. The computer-implemented method of claim 1, further comprising encapsulating each of the fragments with a Point-to-Point encapsulation and a layer 2 encapsulation.

3. The computer-implemented method of claim 1, further comprising determining that the subscriber has QoS properties by examining a subscriber record associated with that subscriber.

4. The computer-implemented method of claim 3, wherein the subscriber record further indicates a depth of the same, single, egress queue, and wherein the same, single, egress queue is one of a plurality of egress queues associated with the subscriber, and wherein determining that the same, single, egress queue for the subscriber supports each fragment in the single first batch Multilink Protocol packet includes determining that the depth of the same, single, egress queue supports each fragment.

5. The computer-implemented method of claim 1, wherein distributively transmitting the fragments includes transmitting the fragments in a round-robin fashion.

6. The computer-implemented method of claim 4, further comprising:
receiving a second packet destined for the subscriber;
fragmenting the second packet into a plurality of fragments, wherein each fragment is encapsulated with a Multilink Protocol encapsulation;
linking each of the fragments to form a single second batch Multilink Protocol packet;
responsive to determining that at least one of the fragments of the single second batch Multilink Protocol packet cannot be supported by the same, single, egress queue, dropping each fragment of the single second batch Multilink Protocol packet.

7. The computer-implemented method of claim 1, further comprising encapsulating each of the fragments according to a layer 2 tunneling protocol (L2TP) encapsulation and a layer 2 encapsulation, and wherein the network element is a L2TP Network Server (LNS), and wherein the network element transmits the fragments towards a L2TP Access Concentrator (LAC).

8. A network element to provide Quality of Service (QoS) for Multilink Protocol subscribers, comprising:
a line card including an egress processing unit comprising:
a Multilink Protocol processing unit including,
a Multilink Protocol batch fragmentation module to fragment packets,
a Multilink Protocol encapsulation module to encapsulate fragmented packets with a Multilink Protocol encapsulation, and
a Multilink Protocol batch processing module coupled with the Multilink Protocol batch fragmentation module, the batch processing module to link fragments of packets into Multilink Protocol batch packets;
a Point-to-Point processing unit coupled with the Multilink Protocol processing unit, the Point-to-Point processing unit including,
a Point-to-Point encapsulation module to encapsulate fragmented packets, and
a layer 2 encapsulation module to encapsulate fragmented packets; and
a Quality of Service (QoS) scheduling unit coupled with the Multilink Protocol processing unit, the QoS scheduling unit including,
a queuing module to determine whether each fragment in a particular Multilink Protocol batch packet destined for a subscriber can be supported in a single, same, egress queue for the subscriber;
a batch packet sequencing module to apply sequence numbers to each of the fragments of a particular one of the Multilink Protocol batch packets destined for a subscriber only upon a determination that each of those fragments can be supported in a single, same, egress queue for the subscriber, and
the queuing module further to queue the Multilink Protocol batch packets according to priority level, wherein for each of the batch Multilink Protocol packets associated with a particular subscriber, the queuing module is to place each fragment of that batch Multilink Protocol packet in a same, single, egress queue associated with a plurality of links towards that subscriber.

9. The network element of claim 8, further comprising an ingress processing unit of a line card of the network element, the ingress processing unit to receive packets and perform a subscriber record lookup to identify the subscriber associated with a certain packet and a subscriber record associated with that subscriber.

10. The network element of claim 9, wherein the subscriber record identifies whether QoS processing is to be performed on that packet.

11. The network element of claim 10, wherein the QoS scheduling unit is further to drop a particular Multilink Protocol batch packet if at least one of the fragments of that Multilink Protocol batch packet cannot be queued.

12. The network element of claim 8, wherein the QoS scheduling unit is further to cause the fragments of the Multilink Protocol batch packets to be distributively transmitted over a plurality of links.

13. The network element of claim 8, wherein the Point-to-Point encapsulation module encapsulates fragmented packets according to a layer 2 tunneling protocol (L2TP) encapsulation, and wherein the network element is a L2TP Network Server (LNS), and wherein the network element is to transmit the fragments of the Multilink Protocol batch packets towards a L2TP Access Concentrator (LAC).

14. A non-transitory machine-readable storage medium that provides instructions that, if executed by a processor, will cause said processor to perform operations for providing Quality of Service (QoS) support for a Multilink Protocol subscriber, wherein the Multilink Protocol subscriber is coupled with a network element with an aggregate link which includes a plurality of member links, comprising:
receiving a first packet destined for the subscriber;
determining whether to fragment the first packet into a plurality of fragments;
fragmenting the first packet into the plurality of fragments, wherein each fragment is encapsulated with a Multilink Protocol encapsulation;
linking each of the fragments to form a single first batch Multilink Protocol packet;
after linking each of the fragments to form the single first batch Multilink Protocol packet, determining whether a single, same, egress queue for the subscriber supports each fragment in the single first batch Multilink Protocol packet; and
responsive to determining that each fragment can be supported in the single, same, egress queue,
applying a Multilink Protocol sequence number to each fragment in the single first batch Multilink Protocol packet;
placing each fragment in the single first batch Multilink Protocol packet in the same, single, egress queue for the subscriber associated with the aggregate link; and
distributively transmitting the fragments over the member links.

15. The non-transitory machine-readable storage medium of claim 14, further comprising encapsulating each of the fragments with a Point-to-Point encapsulation and a layer 2 encapsulation.

16. The non-transitory machine-readable storage medium of claim 14, further comprising determining that the subscriber has QoS properties by examining a subscriber record associated with that subscriber.

17. The non-transitory machine-readable storage medium of claim 16, wherein the subscriber record further indicates a depth of the same, single, egress queue, and wherein the same, single, egress queue is one of a plurality of egress queues associated with the subscriber, and wherein determining that the same, single, egress queue for the subscriber supports each fragment in the single first batch Multilink Protocol packet includes determining that the depth of the same, single, egress queue supports each fragment.

18. The non-transitory machine-readable storage medium of claim 14, wherein distributively transmitting the fragments includes transmitting the fragments in a round-robin fashion.

19. The non-transitory machine-readable storage medium of claim 17, further comprising:
receiving a second packet destined for the subscriber;
fragmenting the second packet into a plurality of fragments, wherein each fragment is encapsulated with a Multilink Protocol encapsulation;
linking each of the fragments to form a single second batch Multilink Protocol packet;
responsive to determining that at least one of the fragments of the single second batch Multilink Protocol packet cannot be supported by the same, single, egress queue, dropping each fragment of the single second batch Multilink Protocol packet.

20. The non-transitory machine-readable storage medium of claim 14, further comprising encapsulating each of the fragments according to a layer 2 tunneling protocol (L2TP) encapsulation and a layer 2 encapsulation, and wherein the network element is a L2TP Network Server (LNS), and wherein the network element transmits the fragments towards a L2TP Access Concentrator (LAC).

* * * * *

UNITED STATES PATENT AND TRADEMARK OFFICE
CERTIFICATE OF CORRECTION

PATENT NO.         : 8,310,924 B2                                        Page 1 of 1
APPLICATION NO.    : 12/121628
DATED              : November 13, 2012
INVENTOR(S)        : Venugopal et al.

It is certified that error appears in the above-identified patent and that said Letters Patent is hereby corrected as shown below:

In Fig. 2A, Sheet 2 of 7, delete "MP ENCAPSULATION MODULE 220" and insert
-- MP ENCAPSULATION MODULE 222 --, therefor.

In Fig. 2B, Sheet 3 of 7, delete "QoS SCIIEDULING UNIT 154" and insert
-- QoS SCHEDULING UNIT 154 --, therefor.

In Fig. 2B, Sheet 3 of 7, delete "(3) ADD L2 ENCAP" and insert -- (3) ADD L2 ENCAP --, therefor.

In Fig. 2B, Sheet 3 of 7, delete "LAYER 2 ENCAPSULATION MODULE 242" and
insert -- LAYER 2 ENCAPSULATION MODULE 242 --, therefor.

In Fig. 2B, Sheet 3 of 7, delete "(4C) SEND QoS FRAG TO MP UNIT 150" and insert
-- (4C) SEND QoS FRAG TO MP UNIT 150 --, therefor.

Signed and Sealed this
Fifth Day of March, 2013

Teresa Stanek Rea
*Acting Director of the United States Patent and Trademark Office*